United States Patent [19]

Nakanishi

[11] 4,240,796
[45] Dec. 23, 1980

[54] METHOD OF TREATING CAPILLARY FIBERS

[75] Inventor: Hikaru Nakanishi, Kawasaki, Japan

[73] Assignee: Senko Medical Instruments Mfg. Co., Ltd., Tokyo, Japan

[21] Appl. No.: 933,612

[22] Filed: Aug. 14, 1978

[30] Foreign Application Priority Data

Aug. 31, 1977 [JP] Japan .................................. 52-104634
Jun. 7, 1978 [JP] Japan .................................. 53-68697

[51] Int. Cl.³ .................................................. B05D 5/00
[52] U.S. Cl. ........................................ 8/137.5; 264/41; 427/2; 427/235
[58] Field of Search ................................ 427/230, 235; 210/500 M, 321 A, 321 B, 23 H, 23 F, 22; 264/41, 1 B, 209, 211; 8/137.5

[56] References Cited

U.S. PATENT DOCUMENTS

| | | | |
|---|---|---|---|
| 3,930,105 | 12/1975 | Christen et al. | 264/41 |
| 3,975,478 | 8/1976 | Leonard | 210/500 M |
| 4,080,744 | 3/1978 | Manos | 210/500 M |
| 4,164,437 | 8/1979 | Henne et al. | 264/211 X |

FOREIGN PATENT DOCUMENTS 864904 5/1952 Fed. Rep. of Germany .

*Primary Examiner*—Shrive P. Beck

[57] ABSTRACT

Novel method of treating capillary fibers comprising introducing into the capillary fibers a carbon chloride fluoride or a mixture of the carbon chloride fluoride with a material capable of forming an azeotrope therewith to remove selectively octyl alcohol, isopropyl myristate and the like from the capillary fibers, retaining glycerol within the wall of said capillary fibers.

4 Claims, No Drawings

METHOD OF TREATING CAPILLARY FIBERS

BACKGROUND OF THE INVENTION

The present invention relates to a method of treating capillary fibers to be used, for example, in blood dialyzer.

German Pat. No. 864,904 discloses a process for producing capillary fibers by extruding a solution or melt of cellulose, from an orifice of several hundred microns into a coagulating solution. In Japanese Patent Publication No. 50-40168, dated Dec. 22, 1975, and the Technical Information Bulletin No. 12 of Enka Glanz Stoff, AG., Wuppertal, West Germany, dated September, 1976, similar capillary fibers made of polymeric cellulose material, such as cellulose acetate, polyacrylonitrile, polymethyl-methacrylate, and the like, by simultaneously extruding through them an oily substance. The oily substance extruded through the center of the extruded polymeric material forms a hollow center in the polymeric material as it is discharged from the extrusion orifice. It is known to use, as the oily substance, octyl alcohol, isopropyl myristate or the like, which are immiscible with the polymeric material. Then, glycerol is added to the hollow capillary fibers as a softening agent. The capillary fibers, with the softening agent, are dried and thereafter wound on a bobbin to continuously produce a semi-permeable capillary tube having a cross section of a true circle. Blood dialyzer used as artificial kidney or the like is prepared by forming a bundle of a large number of the so produced semipermeable capillary fibers having section of true circle, arranging it within the dialyzer housing made of a plastics such as acrylonitrile-styrene copolymer, acrylic resin, polycarbonate, fixing the both ends of the bundle with an adhesive, and thereafter cutting these ends. The oily substance contained within the capillary fibers is then removed by treating the bundle with ethyl alcohol to wash out the substance. This method is proposed by Enka Glanzstoff AG of Germany. However, glycerol contained within the wall of the capillary fibers is also dissolved out and removed. When glycerol has thus been removed, the capability of dialyzation of the dialyzer decreases considerably, even if a drying treatment has been applied to the capillary fibers afterwards. For this reason, it has hitherto been practiced to add glycerol afterwards once more to plasticize the fibers, washing thereafter the fibers with an organic solvent having water content of 70% or smaller to remove the glycerol adhered on the fiber wall, before the fibers are dried. Thus, in this case, a greater number of steps are required as indicated above. Also, the drying requires a longer period of time. Further, water, glycerol and the like will be contained in the organic solvent. Therefore, it is necessary to conduct a distillation operation requiring a large quantity of energy in order to reuse the solvent. In addition, ethyl alcohol has a tendency to catch fire exhibiting a danger of explosion. Furthermore, since ethyl alcohol has a relatively higher surface tension, it cannot penetrate into the inside of the pores of the capillary fibers uniformly, so that a better wash out of whole of the bundle of fibers cannot be attained.

SUMMARY OF THE INVENTION

It is, therefore, an object of the present invention to provide a novel method of treating the capillary fibers which overcomes the deficiencies encountered heretofore.

Other objects and advantages of the present invention will be apparent readily to those skilled in the art from the following disclosures.

These objects are achieved by the present invention which is directed towards the novel method comprizing introducing into the capillary fibers a carbon chloride fluoride selected from the group consisting of trichlorofluoromethane, 1,1,2-trichloro-1,2,2-trifluoroethane and 1,1,2,2-tetrachloro-1,2-difluoroethane, or a mixture of the carbon chloride fluoride with materials forming azeotrope selected from the group consisting of alcohols, ketones, esters, ethers and chlorinated hydrocarbons to thereby remove selectively octyl alcohol, isopropyl myristate and the like among the substances contained within the fibers, leaving glycerol within the wall of said capillary fibers.

DETAILED DESCRIPTION OF THE INVENTION

A blood dialyzer used as an artificial kidney or the like is prepared by forming a bundle of a large number of semipermeable capillary fibers having section of true circle produced by a process similar to the prior process, arranging it in a housing made of a plastics such as acrylonitrilestyrene copolymer, acrylic resin, polycarbonate or the like, and cutting the both ends of the bundle after these ends have been fixed with an adhesive such as epoxy resin. Then a carbon chloride fluoride such as trichlorofluoromethane ($CCl_3F$), 1,1,2-trichloro-1,2,2-trifluoroethane ($CCl_2F$-$CClF_2$), 1,1,2,2-tetrachloro-1,2-difluoroethane ($CCl_2F$-$CCl_2F$) or the like is introduced alone into the inside of the capillary fibers. Alternatively, a mixture of 20–99.9% by weight of the carbon chloride fluoride mentioned above with 0.1–80% by weight of a material capable of forming an azeotrope such as for example alcohols such as ethyl alcohol, isopropylalcohol or the like, ketones such as acetone, esters such as ethyl acetate, chlorinated hydrocarbons such as methylene chloride, and ethers such as ethyl ether is introduced inside the capillary fibers. When the carbon chloride fluoride alone or the mixture of the carbon chloride fluoride with the azeotrope forming material is introduced inside the capillary fibers, oily substance such as octyl alcohol, isopropyl myristate or the like may be dissolved selectively in said carbon chloride fluoride or in said mixture, while no glycerol is substantially dissolved in them. Therefore, the oily substance may be thereby removed from the inside of the fibers, whereas glycerol remains within the wall of the fibers. In addition, since the carbon chloride fluoride reveals a lower surface tension as compared with ethyl alcohol, the carbon chloride fluoride or the mixture may penetrate into the pores of the capillary fibers uniformly, so that a better cleaning of whole the bundle of the fibers are attained. Moreover, by using the carbon chloride fluoride alone or the mixture thereof, it is possible to perform the washing treatment safely without any danger of explosion, as the carbon chloride fluoride is essentially inflammable.

By the way, when a chlorinated hydrocarbon such as trichloroethane which has a construction resembling with 1,1,2-trichloro-1,2,2-trifluoroethane is used alone, faultinesses such as discoloration by clouding and cracking of the plastics of housing such as acrylonitrilestyrene copolymer, acrylic resin, polycarbonate or the like will occur due to the attack of trichloroethane etc.

onto the plastics. On the contrary, the carbon chloride fluoride is chemically stable, does not attack the plastics and is almost innoxious, so that it becomes very easy to operate the washing treatment when the carbon chloride fluoride is used along. Also the mixture of the carbon chloride fluoride with an ester or an ether is chemically stable similarly to the carbon chloride fluoride alone, does not attack the plastics of the housing and is almost harmless, so that it becomes very easy to operate the washing treatment. Mixture of the carbon chloride fluoride with an alcohol will dissolve glycerol in some degree, however, it brings forth substantially no disadvantage, as most of glycerol remains within the wall of the capillary fibers. Mixture of the carbon chloride fluoride with a ketone or with a chlorinated hydrocarbon shows a tendency to attack plastics, so that it is desirable to carry out the treatment in an apparatus made of stainless steel but not of plastics.

The oily substance has then been removed. The bundle of the capillary fibers thus retaining glycerol is then dried and the dialyzer is prepared.

The mixture of the carbon chloride fluoride with alcohol, ketone, ester, chlorinated hydrocarbon or ether exhibits a lower boiling point, so that the drying of the capillary fibers after the washing out will be carried out efficiently and the cost for fuels can be economized.

The blood dialyzer prepared as above exhibits a very high dialyzing efficiency due to the retention of glycerol in the wall of the capillary fibers. According to the method of the present invention, the troublesome procedures of addition of glycerol and removal of the superfluous portion of glycerol by washing out are now unnecessary.

The following examples will illustrate in detail the manner in which the present invention can be practiced. It will be understood, however, that the present invention is not confined to the specific limitations set forth in the individual examples, but rather to the scope of the appended claims.

EXAMPLE 1

A solution of natural cellulose in the form of viscose was extruded from an orifice while at the same time discharging isopropyl myristate into the inside of the so extruded fibers to produce capillary fibers filled up with the oily substance. Then, a large number of the so produced semipermeable capillary fibers having section of true circle were put together into a bundle, which was arranged in a housing of a blood dialyzer made of acrylonitrile-styrene coplymer. Thereafter, the both ends of the bundle were fixed with an adhesive and were cut to prepare a blood dialyzer. Then, 1,1,2-trichloro-1,2,2-trifluoroethane was introduced into the capillary fibers. It was recognized that isopropyl myristate contained inside the capillary fibers was thereby removed selectively, whereas glycerol contained within the wall of the capillary fibers was substantially not dissolved out but was retained within the wall of the fibers. 1,1,2-trichloro-1,2,2-trifluoroethane used herein did not attack the housing made of acrylonitrile-styrene copolymer, so that no discoloration due to clouding nor cracking was noticed. Subsequently the bundle was dried for a brief time and the blood dialyzer was prepared with it. The thus prepared blood dialyzer shows a higher dialyzing efficiency.

COMPARATIVE EXAMPLE 1

The treatment procedures same as in Example 1 were followed, except that ethyl alcohol was employed in place of 1,1,2-trichloro-1,2,2-trifluoroethane. In this case, glycerol contained in the wall of the capillary fibers had been dissolved out by the treatment with ethyl alcohol. The dialyzing efficiency of the dialyzer prepared after the bundle of the capillary fibers had been dried was observed to be considerably decreased.

COMPARATIVE EXAMPLE 2

The treatment procedures same as in Example 1 were followed, except that perchloroethylene was employed in place of 1,1,2-trichloro-1,2,2-trifluoroethane. In this case, perchloroethylene attacked the housing made of acrylonitrile-styrene copolymer to show a discoloration and cracking.

Using trichlorothane, similar faultiness had been recognized.

EXAMPLE 2

The treatment procedures same as in Example 1 were followed, except that a mixture of 50% by weight of 1,1,2-trichloro-1,2,2-trifluoroethane with 50% by weight of ethyl acetate was employed in place of 1,1,2-trichloro-1,2,2-trifluoroethane. Substantially the same results as in Example 1 were obtained.

EXAMPLE 3

The treatment procedures same as in Example 1 were followed, except that a mixture of 96% by weight of 1,1,2-trichloro-1,2,2-trifluoroethane and 4% by weight of ethyl ether was employed in place of 1,1,2-trichloro-1,2,2-trifluoroethane. Substantially the same results as in Example 1 were obtained.

EXAMPLE 4

The treatment procedures same as in Example 1 were followed, except that a mixture of 96% by weight of 1,1,2-trichloro-1,2,2-trifluoroethane and 4% by weight of ethyl alcohol was employed instead of 1,1,2-trichloro-1,2,2-trifluoroethane only. Isopropyl myristate contained in the inside of the capillary fibers was removed selectively, whereas glycerol contained within the wall of the fibers was substantially not dissolved out but was retained therein. The dialyzing efficiency of the dialyzer prepared after the bundle was dried was high.

EXAMPLE 5

The treatment procedures same as in Example 4 were followed, except that a mixture of 65.0% by weight of 1,1,2-trichloro-1,2,2-trifluoroethane and 35.0% by weight of isopropyl alcohol was employed in place of the mixture of 1,1,2-trichloro-1,2,2-trifluoroethane with ethyl alcohol. Substantially same results as in Example 4 were obtained.

EXAMPLE 6

The treatment procedures same as in Example 1 were followed, except that a mixture of 87.5% by weight of 1,1,2-trichloro-1,2,2-trifluoroethane and 12.5% by weight of acetone was employed instead of 1,1,2-trichloro-1,2,2-trifluoroethane alone and the treatment of the fibers was carried out in a treating apparatus made of stainless steel. Isopropyl myristate present inside the capillary fibers was removed selectively, while glycerol contained within the wall of the fibers was substantially not dissolved out but was retained in the wall.

EXAMPLE 7

The treatment procedures as in Example 6 were followed, except that a mixture of 50% by weight of 1,1,2-trichloro-1,2,2-trifluoroethane and 50% by weight of methylene chloride was employed instead of the mixture of 1,1,2-trichloro-1,2,2-trifluoroethane with acetone. Substantially the same results as in Example 6 were obtained.

EXAMPLE 8

The treatment procedures same as in Exampe 1 were followed, except that a mixture of 80% by weight of trichlorofluoromethane and 20% by weight of ethyl acetate was employed in place of 1,1,2-trichloro-1,2,2-trifluoroethane alone. Substantially same results as in Example 1 were obtained.

EXAMPLE 9

The treatment procedures same as in Example 1 were followed, except that a mixture of 90% by weight of 1,1,2,2-tetrachloro-1,2-difluoroethane and 10% by weight of ethyl acetate was employed instead of 1,1,2-trichloro-1,2,2-trifluoroethane alone. Substantially the same results as in Example 1 were obtained.

Although the present invention has been described with preferred embodiments, it is to be understood that variations and modifications may be resorted to as will be apparent to those skilled in the art. Such variations and modifications are to be considered within the purview and scope of the claims appended hereto.

What is claimed is:

1. In the method of forming capillary fibers by extruding polymeric material into a coagulating solution while discharging an oily substance selected from the group consisting of ocytl alcohol and isopropyl myristate into the interior of said extrusion, adding glycerol thereto as a softening agent, and removing the oily substance, the improvement comprising selectively removing said oily substance without removal of said glycerol by washing said extruded fibers with carbon chloride fluoride or a mixture of carbon chloride fluoride with material capable of forming an azeotrope therewith.

2. The method according to claim 1, wherein the carbon chloride fluoride is trichlorofluoromethane, 1,1,2-trichloro-1,2,2-trifluoroethane or 1,1,2,2-tetrachloro-1,2-difluoroethane.

3. The method according to claim 1, wherein the material capable of forming an azeotrope is selected from the group consisting of alcohols, ketones, esters, ethers and chlorinated hydrocarbons.

4. The method according to claim 1, wherein said mixture consists of 20–99.9% by weight of a carbon chloride fluoride selected from the group consisting of trichlorofluoromethane, 1,1,2-trichloro-1,2,2-trifluoroethane and 1,1,2,2-tetrachloro-1,2,-difluoroethane and 0.1–80% by weight of a material capable of forming an azeotrope therewith selected from the group consisting of alcohols, ketones, esters, ethers and chlorinated hydrocarbons.

* * * * *